(12) United States Patent
Siddoway (10) Patent No.: US 10,349,629 B2
(45) Date of Patent: Jul. 16, 2019

(54) HEAD AND HORN PROTECTOR (71) Applicant: Brett L. Siddoway, Hooper, UT (US)

(72) Inventor: Brett L. Siddoway, Hooper, UT (US)

(*) Notice: Subject to any disclaimer, the term of this patent is extended or adjusted under 35 U.S.C. 154(b) by 264 days.

(21) Appl. No.: 15/090,223

(22) Filed: Apr. 4, 2016

(65) Prior Publication Data

US 2016/0212973 A1   Jul. 28, 2016

Related U.S. Application Data

(62) Division of application No. 11/035,605, filed on Jan. 14, 2005, now Pat. No. 9,301,501.

(51) Int. Cl.
*A01K 13/00* (2006.01)

(52) U.S. Cl.
CPC ............ *A01K 13/006* (2013.01); *A01K 13/00* (2013.01)

(58) Field of Classification Search
CPC ............................. A01K 13/00; A01K 13/006
USPC .................................................. 119/850, 851
See application file for complete search history.

(56) References Cited

U.S. PATENT DOCUMENTS

| | | | | |
|---|---|---|---|---|
| 1,102,570 A * | 7/1914 | Callahan | ............. | A01K 13/006 119/850 |
| 3,052,216 A * | 9/1962 | Blunt | ................... | A01K 13/006 119/851 |
| 5,345,751 A * | 9/1994 | Edwards | ............. | A01K 13/006 54/80.2 |
| 5,440,864 A * | 8/1995 | Green | ................. | A01K 13/006 54/80.2 |
| 5,535,707 A * | 7/1996 | Siddoway | ........... | A01K 13/006 119/851 |
| 6,050,068 A * | 4/2000 | White, Jr. | ........... | A01K 13/006 54/80.2 |
| 6,216,642 B1 * | 4/2001 | Hung | ................... | A01K 13/006 119/850 |
| 7,100,349 B2 * | 9/2006 | Andrews | ............. | A01K 13/006 119/850 |
| 7,386,972 B2 * | 6/2008 | Wilson | ................ | A01K 13/006 54/44.7 |
| 2002/0108586 A1 * | 8/2002 | Martin | ................ | A01K 13/006 119/850 |

* cited by examiner

*Primary Examiner* — David J Parsley
(74) *Attorney, Agent, or Firm* — Fehr Law Firm; Thompson E. Fehr (57) ABSTRACT

An improved head and horn protector having a unitary left side head pad and left rear horn pad as well as a unitary right side head pad and right rear horn pad. A left bridging pad has a left bridging pad linear segment of protective material attached to the pad, with a first end connected to the left rear horn pad near an inner edge of the left rear horn pad and a second end preferably attached only to a rear end of the left bridging pad. A right bridging pad is constructed similarly. On each rear horn pad a looped keeper is preferably attached to and angled across each rear horn pad in order to facilitate maintaining a desired length of the bridging pad within such looped keeper. And the lower portion of each horn pad linear segment is used to protect side head pad linear segments and guides.

1 Claim, 10 Drawing Sheets

HEAD AND HORN PROTECTOR

BACKGROUND OF THE INVENTION

Field of the Invention

This invention relates to protective gear to be placed on the head, neck, and horns of cattle that are to be roped.

Description of the Related Art

A number of devices exist for protecting cattle from being injured during the process of roping them.

Until the advent of the protector described in U.S. Pat. No. 5,535,707, however, the available protective devices employed multiple straps and multiple pads, making them inconvenient to utilize.

The device of U.S. Pat. No. 5,535,707, though, employs only a single strap 34.

Two side head pads 14, 16 are made of thick, soft padding material to lie along opposite sides of the head of the animal without impeding its vision.

Extension 18 projects from the upper rear of side head pad 14 in order to extend across the front of a first horn of the animal. Rear horn pad 22 overlaps a portion of side head pad 14 and also projects from the upper middle of side head pad 14 to extend across the rear of such first horn. In use, the free end of extension 18 and the free end of rear horn pad 22 overlap at the upper portion of the horn protector 10. A lower edge 40 of a bridging pad 42 overlies the juncture of extension 18 and side head pad 14 and extends upward therefrom with a first end attached to the rear horn pad 22 and a second end connected to extension 18.

Similarly, extension 20 projects from the upper rear of side head pad 16 in order to extend across the front of a second horn of the animal. Rear horn pad 24 overlaps a portion of side head pad 16 and also projects from the upper middle of side head pad 16 to extend across the rear of such second horn. In use, the free end of extension 20 and the free end of rear horn pad 24 overlap at the upper portion of the horn protector 10. A lower edge 44 of a bridging pad 46 overlies the juncture of extension 20 and side head pad 16 and extends upward therefrom with a first end attached to the rear horn pad 24 and a second end connected to extension 20. (In viewing FIG. 4 of U.S. Pat. No. 5,535,707 and reading the text in lines 12 through 26 of column 2, it is evident that rear horn pad 24 has not been correctly portrayed in FIG. 4.)

Each side head pad 14, 16; each rear horn pad 22, 24; each extension 18, 20 (as shown but not explicitly described); and each bridging pad 42, 46 is backed with a heavy webbing material ". . . that will give the pads a measure of rigidity and that will resist the abrasion of a rope . . . ."

A web loop keeper 58 extends along rear horn pad 22 near the end of rear horn pad 22; and a similar web loop keeper 60 extends along rear horn pad 24 near the end of rear horn pad 22.

Attached to the free end of extension 18 is a buckle 30; and connected to the free end of extension is a strap.

Lines 44 through 51 in column 2 of U.S. Pat. No. 5,535,707 explain that guides 62 and 64 "extend from close to the upper edges 66 and 68, respectively, of side head pads 14 and 16, respectively, to locations close to lower edges 70 and 72, respectively, of the side head pads 14 and 16. The guides 62 and 64 are also preferably made of durable web material and are sewn lengthwise along their opposite side edges to the side head pads."

Lines 52 through 55 in column 5 continue, "Strap 34, connected to the end of extension 20, passes downwardly through guide 62, beneath side head pad 14 and upwardly through the guide 64. In this configuration the protector 10 is ready for installation on a steer 12."

BRIEF SUMMARY OF THE INVENTION

The present Improved Head and Horn Protector is based upon the protector of U.S. Pat. No. 5,535,707.

There is, however, no longer a separate extension and rear horn pad. Each rear horn pad is an extension of the respective side head pad with the rear horn pad and the side head pad constituting a unitary structure.

Moreover, the second end of each bridging pad is preferably left free so that, in the preferred embodiment, a buckle (which, as used herein, shall designate any releasable fastener for a strap that is known in the art, including—but not limited to—a traditional "buckle") is attached to the second end of the bridging pad on either the left or right segment of the protector; and a strap is connected to the second end of the other bridging pad.

Additionally, the optional looped keeper on each rear horn pad is preferably angled in order to create greater friction against the bridging pad protector as it passes through the looped keeper and thereby facilitate maintaining a desired length of the bridging pad within or past such looped keeper.

And one edge of each guide is preferably placed underneath a protective linear segment for the respective side head pad in order to eliminate the effects of abrasion on the connection of such guide to the respective side head pad.

Similarly, each end of each looped keeper is preferably folded under a protective linear segment in order to protect the connections of the looped keepers to the rear horn pad from abrasion.

Rather than directly attaching a free end of the protective material overlying the rear horn pad to the outer surface of a respective side head pad, a segment of elastic (stretch) webbing is optionally inserted between such free end and the respective side head pad.

The lower edge of the protective material overlying each bridging pad preferably extends below the lower edge of the respective bridging pad except near the second end of such protective material in order to facilitate initial introduction of the bridging pad into the respective looped keeper and subsequent retention of the positions of the respective bridging pad and rear horn pad with respect to each other.

And, preferably, either a rigid (preferably hard plastic or steel) panel or a cushion is placed between the protective material and the rear horn pad to provide added protection.

DETAILED DESCRIPTION OF THE INVENTION

As indicated above, the present Improved Head and Horn Protector is based upon the protector of U.S. Pat. No. 5,535,707.

Figure 1:
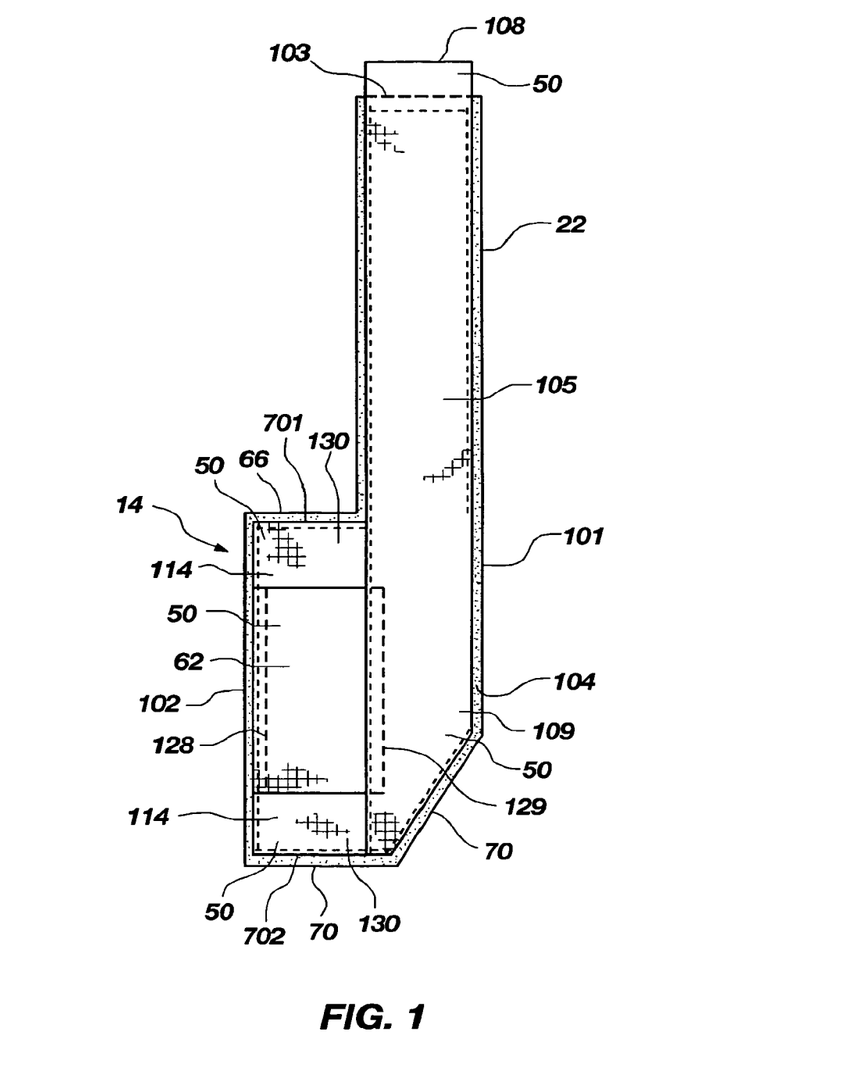
FIG. 1 shows a unitary unfolded side head pad and rear horn pad.
Figure 2:
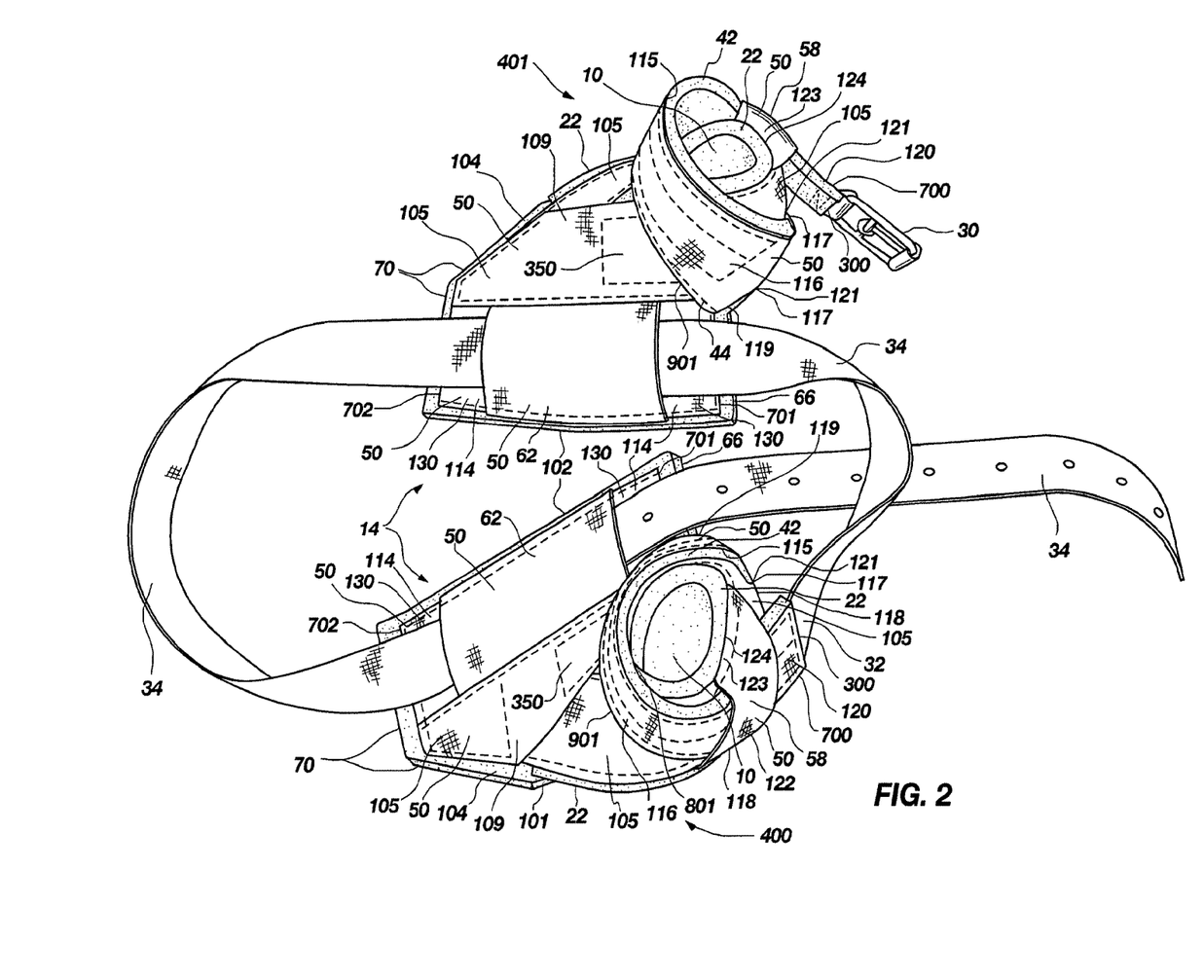
FIG. 2 is a perspective view from the rear of the Improved Head and Horn protector with a free end of a rear horn pad and the free end of a linear segment of protective material (for the side head pad and rear horn pad) inside the lower portion of the linear segment of protective material (for the side head pad and rear horn pad) but outside the outer surface of the side head pad.

A first major improvement to the protector of U.S. Pat. No. 5,535,707 is that there is no longer a separate extension and rear horn pad. Side head pad 14 extends, as shown in FIG. 1, substantially straight up from the upper edge 66 of the side head pad 14 near the front 101 of side head pad 14 creating a rear horn pad 22 that is an integral part of side head pad 14. Rear horn pad 22 is, as seen in FIG. 2, bent toward the front 101 of side head pad 14 and has its free end 103 placed beside the side head pad 14, preferably on the outer surface 104 of the side head pad 14. Beginning near the lower edge 70 of side head pad 14, a linear segment of protective, preferably heavy webbing, material 50 designated the horn pad linear segment 105 is attached to the outer surface 104 of the side head pad 14 and continues connected along the outer surface 106 of rear horn pad 22 past the free end 103 of rear horn pad 22 until the free end 108 of the horn pad linear segment 105 of the protective, preferably heavy webbing, material 50 is attached to the lower portion 109 of the horn pad linear segment 105, either directly or by being connected to the side head pad 14.

Figure 3:
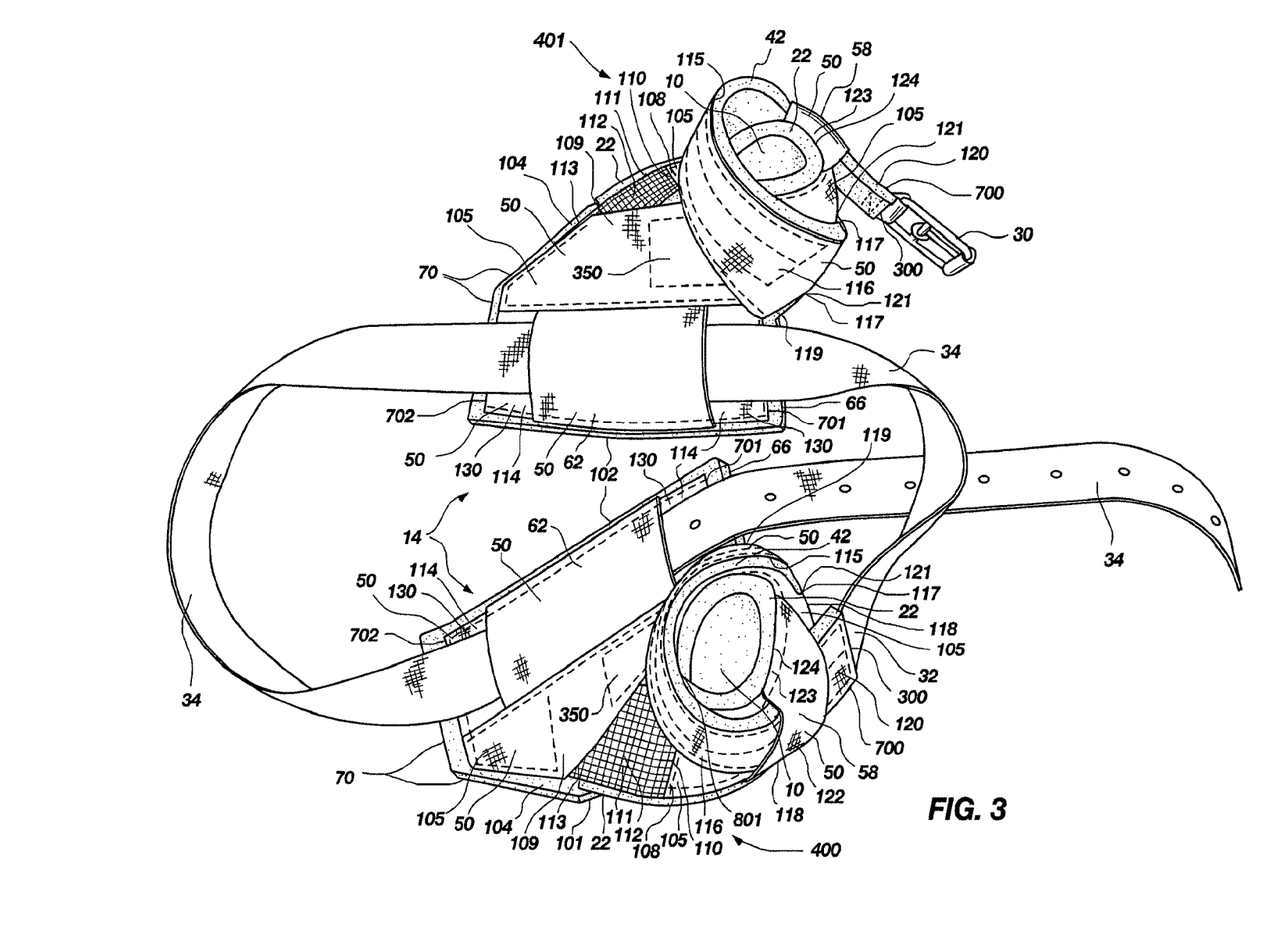
FIG. 3 illustrates a segment of elastic webbing material connected between the free end of the linear segment of protective material (for the side head pad and rear horn pad) and the lower portion of the linear segment of protective material (for the side head pad and rear horn pad).

Having a unitary rear horn pad 22 rather than an extension and a rear horn pad provides for better self-adjustment of the protector 10 around the rear of a horn. Such self-adjustment is further improved by optionally, as portrayed in FIG. 3, attaching the free end 108 of the horn pad linear segment 105 to a first end 110 of a segment 111 of elastic (stretch) webbing material 112. A second end 113 of the segment 111 is then connected to the lower portion 109 of the horn pad linear segment 105 either directly or by being connected to the side head pad 14.

Figure 4:
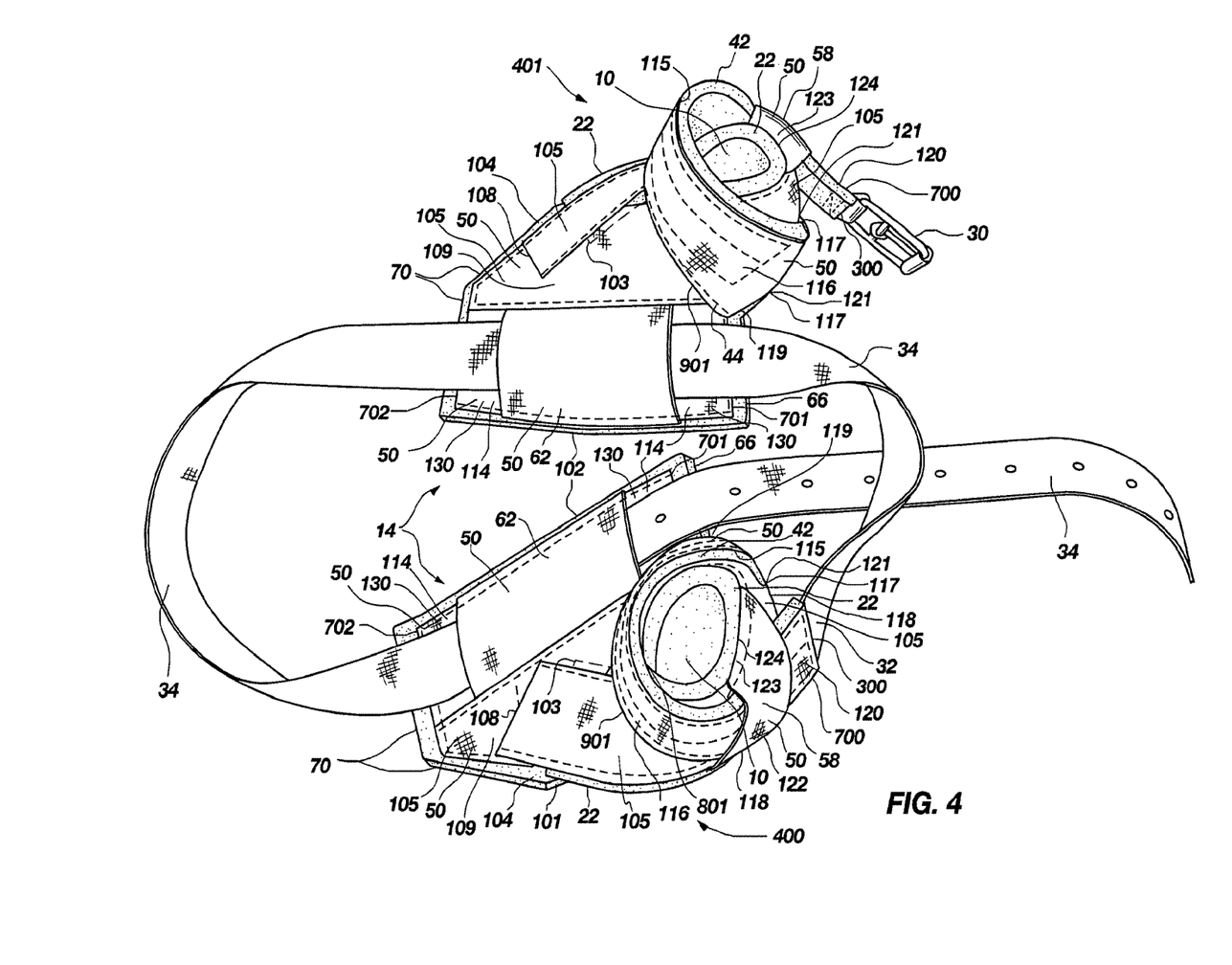
FIG. 4 is a perspective view from the rear of the Improved Head and Horn protector with the free end of a linear segment of protective material (for the side head pad and rear horn pad) outside the lower portion of the linear segment of protective material (for the side head pad and rear horn pad) and with the free end of the rear horn pad inside the lower portion of the linear segment of protective material (for the side head pad and rear horn pad) but outside the outer surface of the side head pad.
Figure 5:
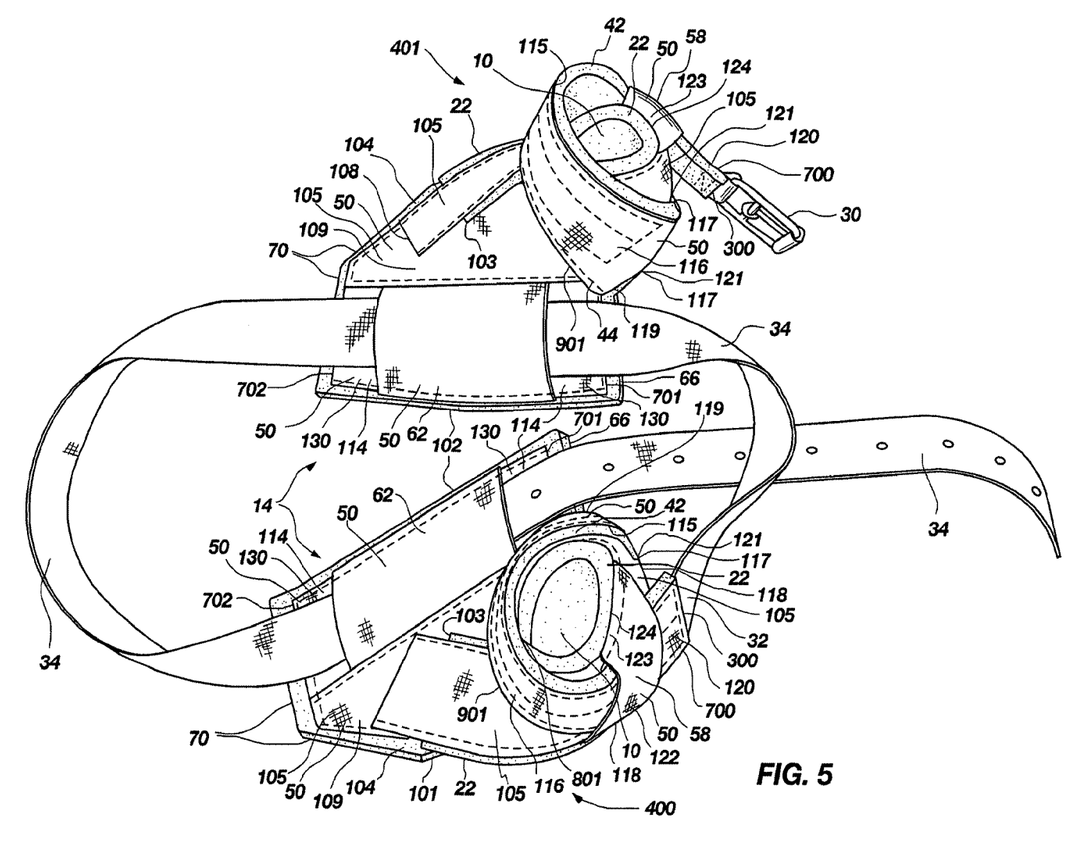
FIG. 5 is a perspective view from the rear of the Improved Head and Horn protector with the free end of a linear segment of protective material (for the side head pad and rear horn pad) and a free end of the rear horn pad outside the lower portion of the linear segment of protective material (for the side head pad and rear horn pad).
Figure 6:
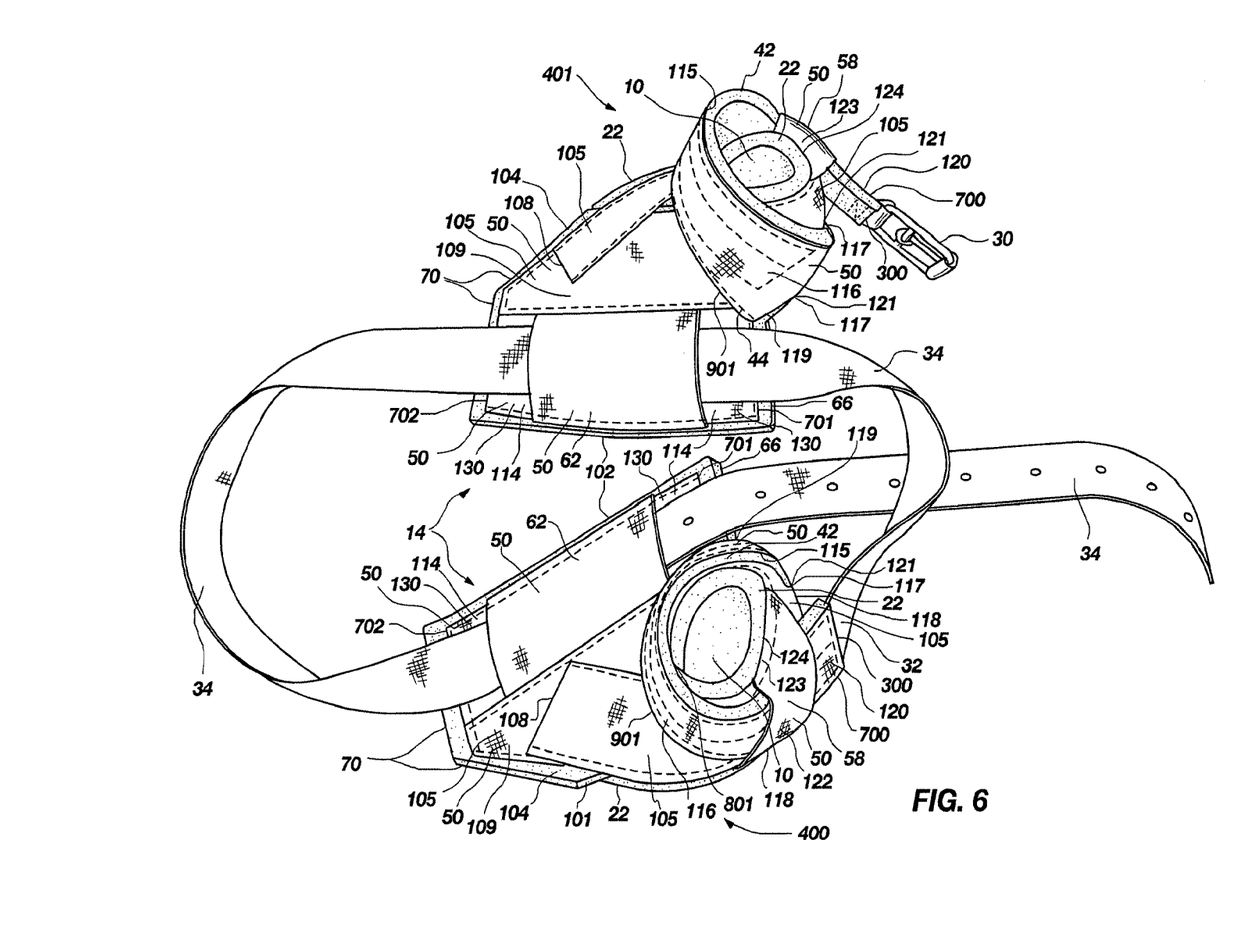
FIG. 6 is a perspective view from the rear of the Improved Head and Horn protector with the free end of a linear segment of protective material (for the side head pad and rear horn pad) outside the lower portion of the linear segment of protective material (for the side head pad and rear horn pad) and with the free end of the rear horn pad inside the inner surface of the side head pad.
Figure 7:
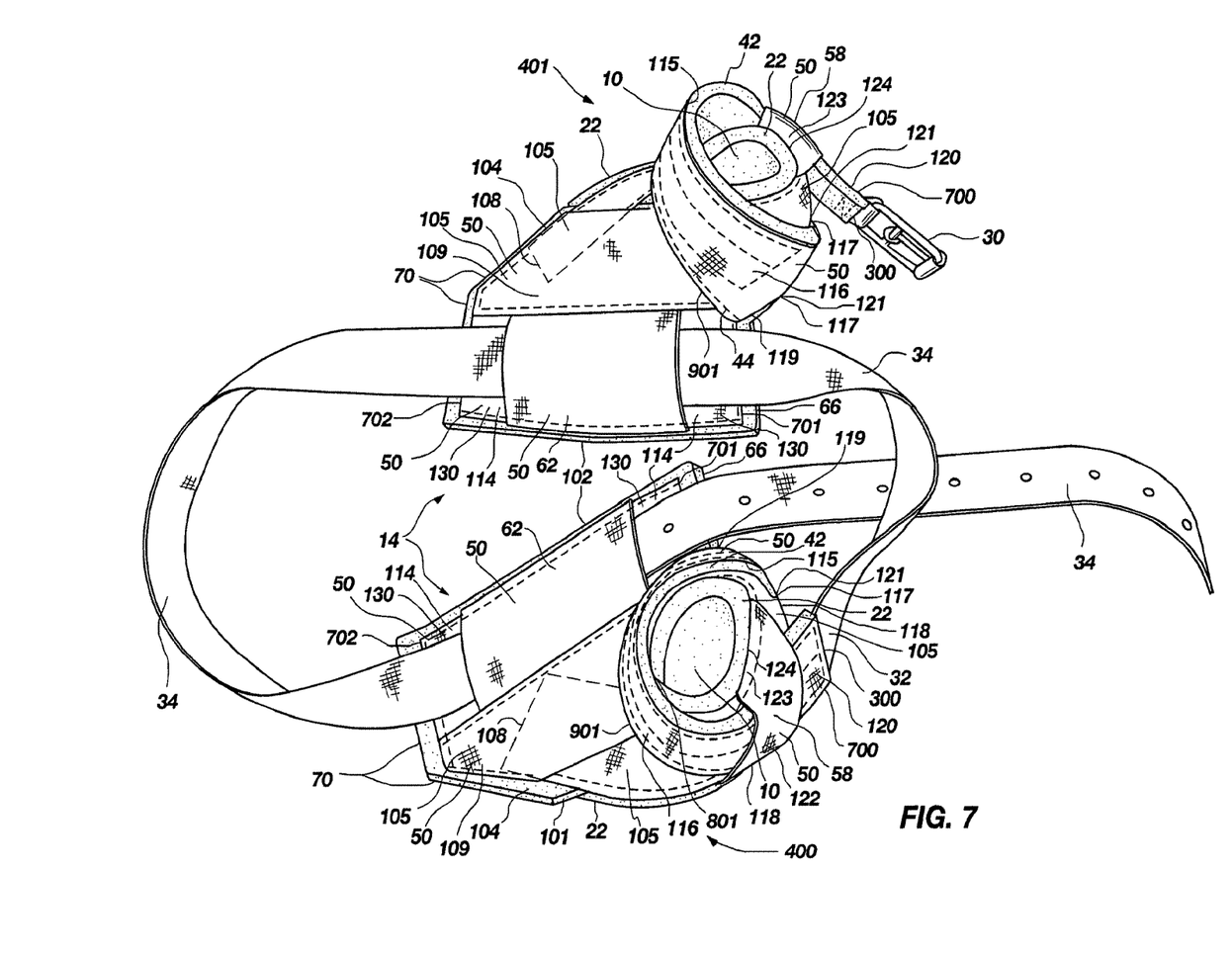
FIG. 7 is a perspective view from the rear of the Improved Head and Horn protector with the free end of a linear segment of protective material (for the side head pad and rear horn pad) inside the lower portion of the linear segment of protective material (for the side head pad and rear horn pad) and with the free end of the rear horn pad inside the inner surface of the side head pad.
Figure 8:
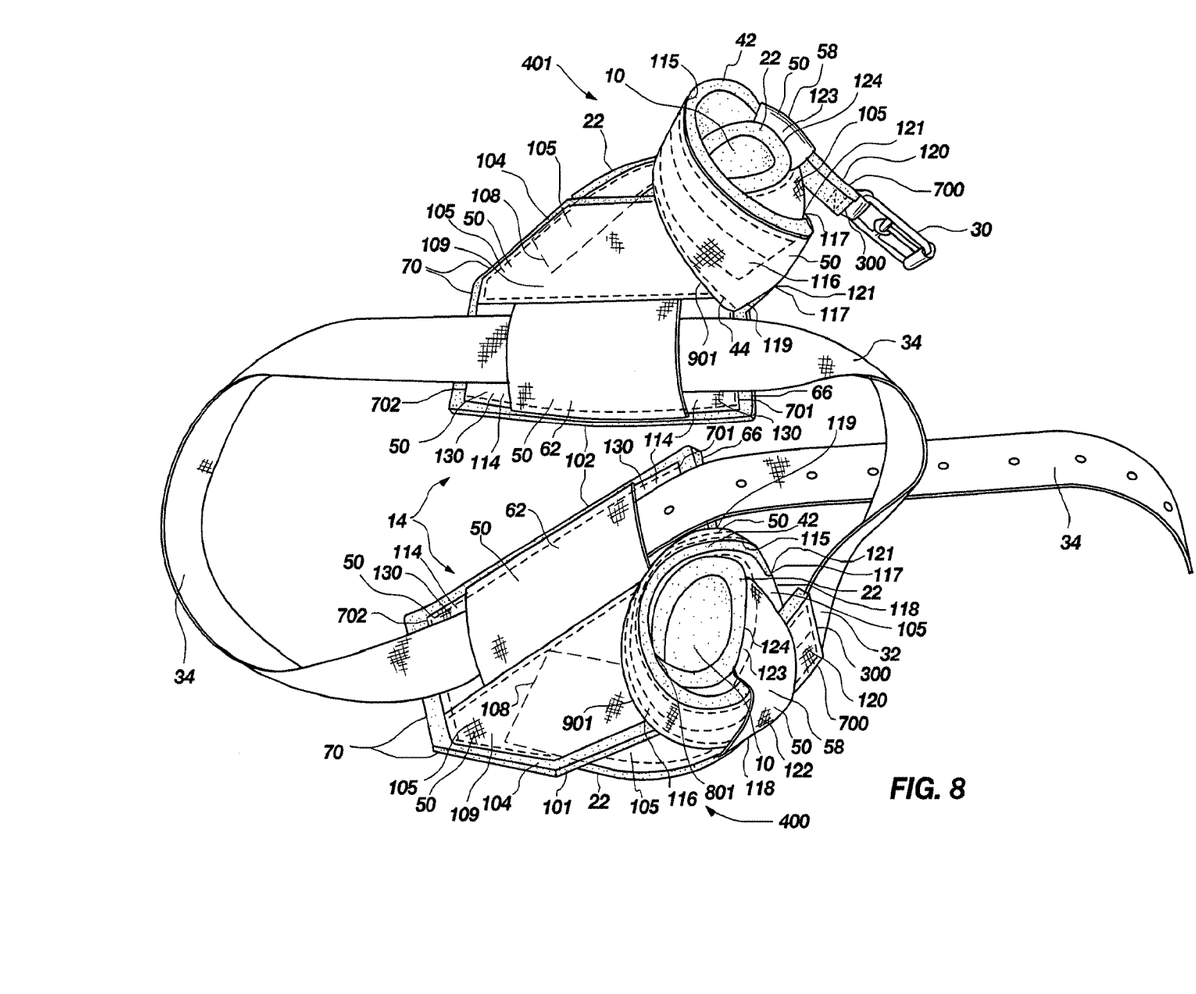
FIG. 8 is a perspective view from the rear of the Improved Head and Horn protector with both the free end of a linear segment of protective material (for the side head pad and rear horn pad) and the free end of the rear horn pad inside the inner surface of the side head pad.

At least six options exist for locating the free end 108 of the horn pad linear segment 105 (or, when the stretch webbing material 112 is employed, the second end 113 of the segment 111) and the free end of the rear horn pad 22 with respect to the lower portion 109 of the horn pad linear segment 105; in the first three options both the free end 108 of the horn pad linear segment 105 (or, when the stretch webbing material 112 is employed, the second end 113 of the segment 111) and the free end of the rear horn pad 22 are outside the outer surface 104 of the side head pad 14, as shown in FIGS. 2, 4, and 5 whereas in the last three options the free end of the rear horn pad 22 is always inside the inner surface 204 of the side head pad 14, as demonstrated in FIGS. 6, 7, and 8. For the first three options, either (a) the free end 108 of the horn pad linear segment 105 (or, when the stretch webbing material 112 is employed, the second end 113 of the segment 111) but not the free end 103 of the rear horn pad 22 can be outside the lower portion 109 of the horn pad linear segment 105, as illustrated in FIG. 4; (b) both the free end 108 of the horn pad linear segment 105 (or, when the stretch webbing material 112 is employed, the second end 113 of the segment 111) and the free end 103 of the rear horn pad 22 can be outside the lower portion 109 of the horn pad linear segment 105, as illustrated in FIG. 5; or (c), preferably, both the free end 108 of the horn pad linear segment 105 (or, when the stretch webbing material 112 is employed, the second end 113 of the segment 111) and the free end 103 of the rear horn pad 22 can, as shown in FIG. 2, be inside the lower portion 109 of the horn pad linear segment 105. Especially, when the stretch webbing material is utilized, it is preferable to have the lower portion 109 of the horn pad linear segment 105 outside the second end 113 of the segment 111 of stretch webbing material 112 in order to provide protection for the stretch webbing material 112. And, similarly, for the last three options, either (a) the free end 108 of the horn pad linear segment 105 (or, when the stretch webbing material 112 is employed, the second end 113 of the segment 111) can be outside the lower portion 109 of the horn pad linear segment 105 while the free end 103 of the rear horn pad 22 is inside the inner surface 204 of the side head pad 14, as illustrated in FIG. 6; (b) the free end 108 of the horn pad linear segment 105 (or, when the stretch webbing material 112 is employed, the second end 113 of the segment 111) can be between the lower portion 109 of the horn pad linear segment 105 and the side head pad 14 while the free end 103 of the rear horn pad 22 is inside the inner surface 204 of the side head pad 14, as illustrated in FIG. 7; and (c) both the free end 108 of the horn pad linear segment 105 (or, when the stretch webbing material 112 is employed, the second end 113 of the segment 111) and the free end 103 of the rear horn pad 22 can, as shown in FIG. 8, be inside the inner surface 204 of the side head pad 14.

Figure 10:
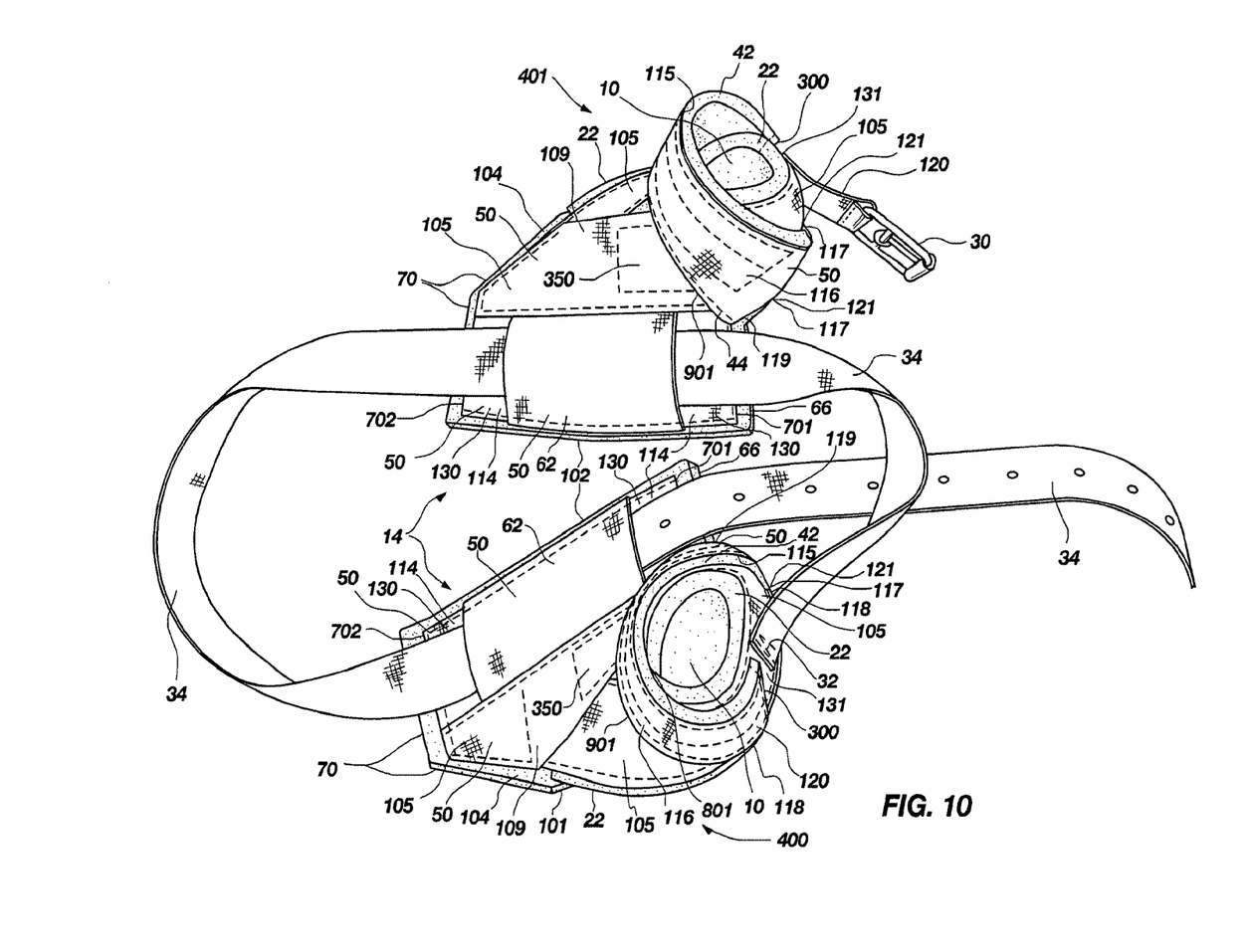
FIG. 10 is the same as the embodiment of FIG. 2 except that the second end of each bridging pad linear segment is attached to the corresponding rear horn pad, a buckle is attached to the right rear horn pad rather than to the rear end of the right bridging pad, and a first end of a strap is connected to the left rear horn pad rather than to the rear end of the left bridging pad.

A bridging pad 42 extends across the point 801 where the horn pad linear segment 105 initially overlaps itself. Attached to the outer surface 115 of bridging pad 42 is a second linear segment, designated the bridging pad linear segment 116, of the protective, preferably heavy webbing, material 50. A first end 117 of the bridging pad linear segment 116 is attached to the rear horn pad 22 near the inner edge 118 of the rear horn pad 22 and, preferably, near the point 119 where the folded rear horn pad 22 extends downward past the upper edge 66 of the side head pad 14. The second end 120 of the bridging pad linear segment 116 is, as shown in FIG. 2, FIG. 4, FIG. 5, FIG. 6, FIG. 7, and FIG. 8, preferably attached only to a rear end 300 of the bridging pad 42 in order to aid further the adjustability of the protector 10 and is, thus, the second major improvement in this protector 10. If, however, such second end 120 is not left free, it is not attached to rear end 300 of the bridging pad 42; rather, as shown in FIG. 10, it is attached to the rear horn pad 22 near the inner edge 118 of the rear horn pad 22 but farther to the front than the location 121 where the first end 117 of the bridging pad linear segment 116 is attached to the rear horn pad 22.

Figure 9:
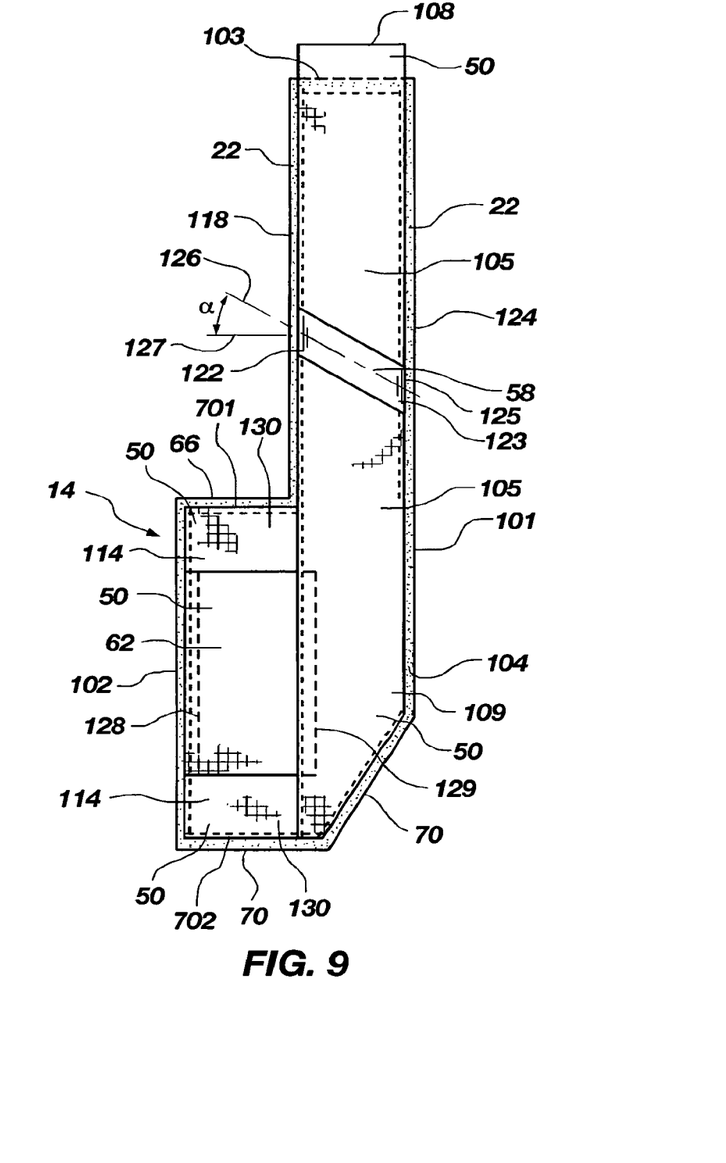
FIG. 9 depicts a looped keeper connected to the rear horn pad.

A looped keeper 58 is preferably employed when the second end 120 of the bridging pad linear segment 116 is left free. A first end 122 of the looped keeper is connected to the rear horn pad 22 near the inner edge 118 of the rear horn pad 22 but farther to the front than the location 121 where the first end 117 of the bridging pad linear segment 116 is attached to the rear horn pad 22. Preferably, the second end 123 of the looped keeper 58 is connected to the rear horn pad 22 near the outer edge 124 of the rear horn pad 22 in such a location 125 that the longitudinal axis 126 of the looped keeper 58 makes, as illustrated in FIG. 9, an acute angle a with an imaginary line 127 drawn perpendicularly to the inner edge 118 and the outer edge 124 of the rear horn pad 22. This constitutes a third major improvement of the protector 10. The rear end 300 of the bridging pad 42 and the second end 120 of the bridging pad linear segment 116 are passed through the looped keeper 58. Thus, with the bridging pad 42 and the bridging pad linear segment 116 extending through the looped keeper 58, the angled orientation of the looped keeper 58 tends to create more frictional resistance on the bridging pad linear segment 116 and, therefore, to facilitate maintaining a desired length 700 of the bridging pad 42 within or past such looped keeper 58. Preferably, the looped keeper 58 is composed of heavy webbing material.

The first end 122 and the second end 123 of the looped keeper 58 are preferably placed between the horn pad linear segment 105 and the outer surface 106 of rear horn pad 22 in order to protect the connections to the rear horn pad 22 from abrasion.

The lower edge 901 of the bridging pad linear segment 116 preferably extends beyond the lower edge 44 of the bridging pad 42 except near the second end 120 of the bridging pad linear segment 116 in order to facilitate introduction of the bridging pad 42 into the looped keeper 58 initially and then frictional retention of the bridging pad 42 with respect to the rear horn pad 22 subsequently.

A third linear segment, designated the side head pad linear segment 114, of the protective, preferably heavy webbing, material 50 commences near the rear 102 of side head pad 14; runs transversely near to, and preferably under, the lower portion 109 of the horn pad linear segment 105; and is attached to the outer surface 104 of the side head pad 14. Longitudinally, the side head pad linear segment 114 runs from near the lower edge 70 of the side head pad 14 to near the upper edge 66 of the side head pad 14.

A guide 62 extends from below the upper edge 66 of the side head pad 14 (and, on the outer surface 130 of the side head pad linear segment 114, preferably, from below the upper edge 701 of the side head pad linear segment 114) to above the lower edge 70 of side head pad 14 (and, preferably, to above the lower edge 702 of the side head pad linear segment 114). The guide 62 is composed of the protective, preferably heavy webbing, material 50. Furthermore, the guide 62 has a first edge 128 which is preferably folded under the side head pad linear segment 114 and which is connected to the side head pad linear segment 114 and, preferably, to the side head pad 14. A second edge 129 of the guide 62 is attached to the side head pad 14 by being connected to the outer surface 130 of the side head pad linear segment 114 with such second edge 129 preferably being underneath the lower portion 109 of the horn pad linear segment 105.

Having the side head pad linear segment 114 running under the lower portion 109 of the horn pad linear segment 105 and having the second edge 129 of the guide 62 underneath the lower portion 109 of the horn pad linear segment 105, as illustrated in FIG. 2, FIG. 4, FIG. 5, FIG. 6, FIG. 7, and FIG. 8, protects the connections of these elements to side head pad 14 from abrasion in the preferred construction of the side head pad linear segment 114 and the guide 62. This creates the fourth major improvement of the protector 10.

Side head pad 14, rear horn pad 22, and bridging pad 42 are composed of soft padding material of a thickness selected to cushion force from a rope—preferably, approximately one-half inch of felt.

Preferably, an internal shield 350 (either a rigid panel—preferably composed of hard plastic or steel—or a cushion which is preferably composed of twenty-pound closed cell foam) is placed between the horn pad linear segment 105 and the rear horn pad 22, beginning near the point 119 where the rear horn pad 22 extends downward past the upper edge 66 of the side head pad 14 and then proceeding downward, preferably to a point substantially adjacent to the guide 62 and intermediate the edges 701, 702 of the side head pad linear segment 114 and, most preferably, for approximately three inches. This provides added protection in the most likely spot to be affected during roping.

Preferably, all connections are done by sewing.

The description so far applies to a right portion 400 of the protector 10. A left portion 401 of the protector 10 is constructed as a mirror image of the right portion 400 except for the features described below.

If the second end 120 of the bridging pad linear segment 116 is attached to the rear end 300 of the bridging pad 42 of the left portion 401, a buckle 30 is also attached to the rear end 300 of the bridging pad 42 of the left portion 401. (Alternatively, the buckle 30 can be attached to the rear end 300 of the bridging pad 42 of the right portion 400.) And a first end 32 of a strap 34 is connected to the rear end 300 of the bridging pad 42 of the right portion 400 if the second end 120 of the bridging pad linear segment 116 is attached to the rear end 300 of the bridging pad 42 of the right portion 400. (Again, alternatively, the first end 32 of the strap 34 is connected to the rear end 300 of bridging pad 42 of the left portion 401 when the buckle 30 is attached to the rear end 300 of bridging pad 42 of the right portion 400.) And if either second end 120 of a bridging pad linear segment 116 is attached to the rear horn pad 22, as illustrated in FIG. 10, the buckle 30 or first end 32 of the strap 34 that would have been connected to the rear end 300 of the related bridging pad 42 is, instead, attached to the respective rear horn pad 22 near the uppermost point 131 of such rear horn pad 22, as portrayed in FIG. 10; either of such connections may be directly to the rear horn pad 22 or indirectly to the rear horn pad 22 by having the buckle 30 or first end 32 of the strap 34 connected directly to the appropriate horn pad linear segment 105.

Installation of the protector 10 on an animal is accomplished essentially as stated in U.S. Pat. No. 5,535,707.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

I claim:

1. An improved head and horn protector of the type having a unitary left side head pad and left rear horn pad formed by extending the left side head pad substantially straight up from an upper edge of the left side head pad near a front of the left side head pad so that the left rear horn pad can be bent toward the front of the left side head pad and have a free end of the left rear horn pad placed beside the left side head pad, a left bridging pad, a left guide, a unitary right side head pad and right rear horn pad formed by extending the right side head pad substantially straight up from an upper edge of the right side head pad near a front of the right side head pad so that the right rear horn pad can be bent toward the front of the right side head pad and have a free end of the right rear horn pad placed beside the right side head pad, a right bridging pad, a right guide, a strap, a releasable connector for the strap, and covers of protective material, wherein the improvement comprises:

a left horn pad linear segment of protective material, said left horn pad linear segment having a lower portion beginning near a lower edge of the left side head pad, said left horn pad linear segment being attached to an outer surface of the left side head pad, said left horn pad linear segment continuing along and being attached to an outer surface of the left rear horn pad, and said left horn pad linear segment proceeding past a free end of the left rear horn pad until a free end of said left horn pad linear segment is connected to the lower portion of said left horn pad linear segment;

a left bridging pad linear segment of protective material attached to an outer surface of the left bridging pad and also having a first end attached to the left rear horn pad near an inner edge of the left rear horn pad;

a left side head pad linear segment of protective material commencing near a rear of the left side head pad, running transversely near to the lower portion of said left horn pad linear segment, being attached to the outer surface of the left side head pad, and running longitudinally from near a lower edge of the left side head pad to near an upper edge of the left side head pad;

a left guide of protective material extending on an outer surface of said left side head pad linear segment from below the upper edge of the left side head pad to above the lower edge of the left side head pad, having a first edge connected to said left side head pad linear segment, and having a second edge attached to the outer surface of said left side head pad linear segment;

a right horn pad linear segment of protective material, said right horn pad linear segment having a lower portion beginning near a lower edge of the right side head pad, said right horn pad linear segment being attached to an outer surface of the right side head pad, said right horn pad linear segment continuing along and being attached to an outer surface of the right rear horn pad, and said right horn pad linear segment proceeding past a free end of the right rear horn pad until a free end of said right horn pad linear segment is connected to the lower portion of said right horn pad linear segment;

a right bridging pad linear segment of protective material attached to an outer surface of the right bridging pad and also having a first end attached to the right rear horn pad near an inner edge of the right rear horn pad;

a right side head pad linear segment of protective material commencing near a rear of the right side head pad, running transversely near to the lower portion of said right horn pad linear segment, being attached to the outer surface of the right side head pad, and running longitudinally from near a lower edge of the right side head pad to near an upper edge of the right side head pad;

a right guide of protective material extending on an outer surface of said right side head pad linear segment from below the upper edge of the right side head pad to above the lower edge of the right side head pad, having a first edge connected to said right side head pad linear segment, and having a second edge attached to the outer surface of said right side head pad linear segment;

a left segment of stretch webbing material inserted between the free end of said left horn pad linear segment and the lower portion of said left horn pad linear segment by having a first end of said left segment of stretch webbing material attached to the free end of said left horn pad linear segment and having a second end of said left segment of stretch webbing material attached to the lower portion of said left horn pad linear segment; and a right segment of stretch webbing material inserted between the free end of said right horn pad linear segment and the lower portion of said right horn pad linear segment by having a first end of said right segment of stretch webbing material attached to the free end of said right horn pad linear segment and having a second end of said right segment of stretch webbing material attached to the lower portion of said right horn pad linear segment.

* * * * *